UNITED STATES PATENT OFFICE.

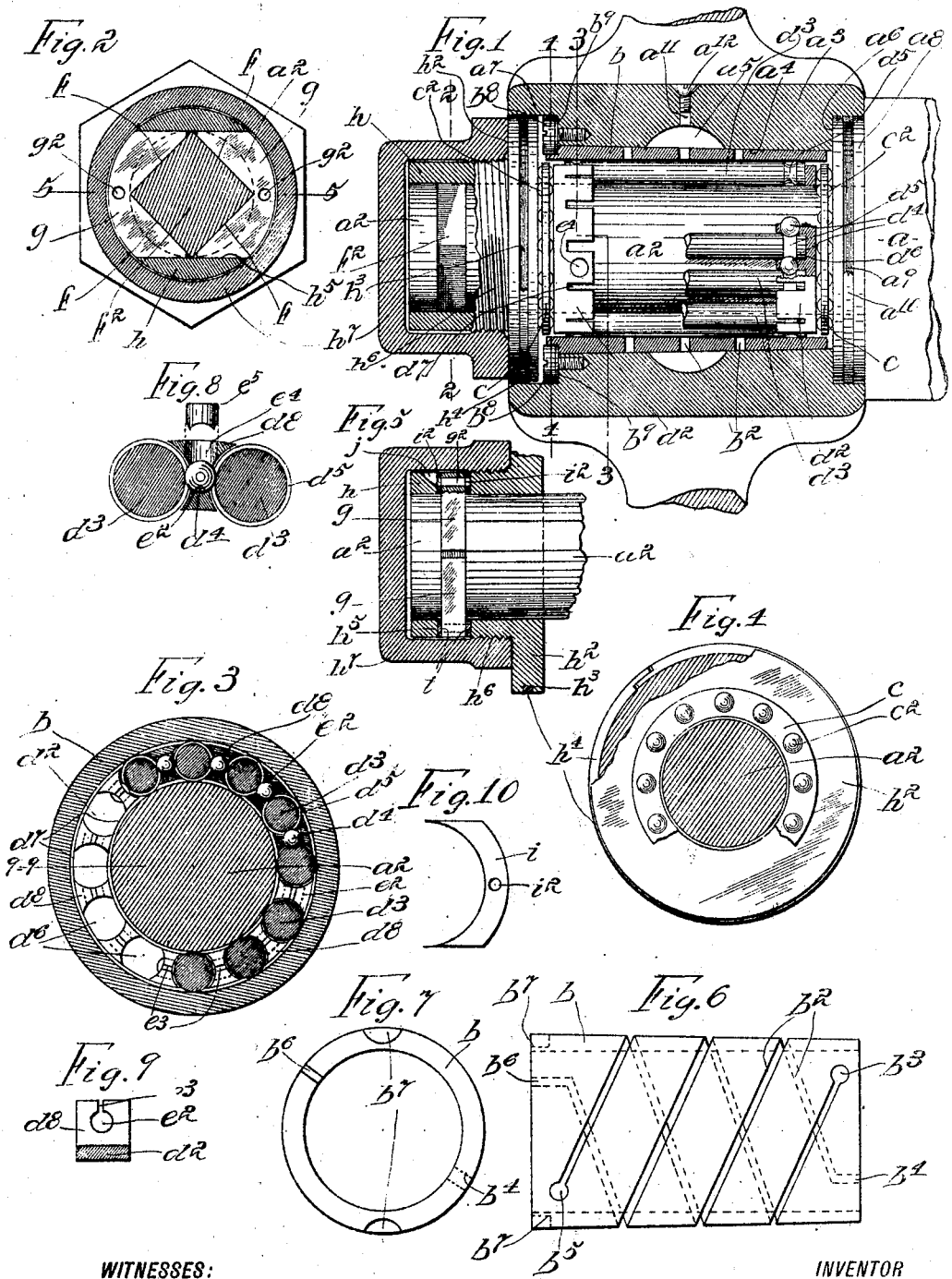
J. NEWMANN.
ROLLER BEARING.
APPLICATION FILED SEPT. 1, 1909.
969,763.
Patented Sept. 6, 1910.

JOHN NEWMANN, OF BROOKLYN, NEW YORK.

ROLLER-BEARING.

969,763.  Specification of Letters Patent.  Patented Sept. 6, 1910.

Application filed September 1, 1909. Serial No. 515,563.

*To all whom it may concern:*

Be it known that I, JOHN NEWMANN, a citizen of the United States, and residing at Brooklyn, in the county of Kings and State of New York, have invented certain new and useful Improvements in Roller-Bearings, of which the following is a specification, such as will enable those skilled in the art to which it appertains to make and use the same.

This invention relates to roller bearings for spindles, journals and like devices; and the object thereof is to provide an improved bearing of this class which may be used wherever such bearings are required and which will operate with a minimum of friction, and which may also be adjusted so as to take up the wear occasioned by use; and with this and other objects in view the invention consists of a bearing of the class specified constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view representing my improved bearing applied to the spindle of an axle and showing the hub of a wheel mounted thereon, the hub of the wheel and the bearing being shown in section, with part of the construction broken away. Fig. 2, a partial section on the line 2—2 of Fig. 1. Fig. 3, a partial section on the line 3—3 of Fig. 1. Fig. 4, a partial section on the line 4—4 of Fig. 1. Fig. 5, a partial section on the line 5—5 of Fig. 2 and showing parts of the construction not shown in Fig. 2. Fig. 6, a side view of an elastic sleeve which forms a part of my improved bearing. Fig. 7, an end view thereof. Fig. 8, a view similar to Fig. 3 but showing only part of the construction shown in said figure and showing the same on an enlarged scale. Fig. 9, a side view of a detail of the construction shown in Fig. 8 and partly in section, and Fig. 10, a side view of a packing plate which I employ.

In the drawing forming part of this specification I have shown at $a$ an axle provided with a spindle $a^2$ and at $a^3$ I have shown the hub of a wheel mounted on said spindle and said hub is provided with the usual bore $a^4$ which is tapered from one end to the other, the end thereof adjacent to the outer end of the spindle being larger than the other end thereof. The hub $a^3$ is also provided in the inner walls thereof or in the wall of said bore, with an annular groove $a^5$ and in the opposite ends thereof with annular rabbet grooves $a^6$ and $a^7$, the rabbet groove $a^7$ being in the outer end of said hub and the axle $a$ is provided, or the spindle $a^2$ adjacent to said axle, is provided with a hub member $a^8$ which fits in the annular rabbet groove $a^6$ and said hub member $a^8$ is provided with a packing ring groove $a^9$ in which is placed a packing ring $a^{10}$.

Formed in the hub $a^3$ is a radial bore or passage $a^{11}$ which communicates with the groove $a^5$ in said hub and which is closed by a removable screw $a^{12}$, the opening of this construction being to provide means for lubricating the bearing as hereinafter described. I also provide an elastic packing sleeve $b$ which is fitted into the hub $a^3$ as shown in Fig. 1, said sleeve being clearly shown in Figs. 6 and 7, and this sleeve is provided with spiral slots $b^2$, one of which begins adjacent to one end thereof as shown at $b^5$ and opens through the other end as shown at $b^4$ and the other of which begins adjacent to the other end of said sleeve as shown at $b^3$ and opens through the opposite end thereof as indicated at $b^6$. The sleeve $b$ is provided at its longer or outer end and in the opposite sides thereof with recesses $b^7$ adapted to receive the heads of screws $b^8$ as clearly shown in Fig. 1 and these screws are intended to hold the sleeve $b$ in the desired position in the hub $a^3$ and between the heads of said screws and the annular inner walls of the rabbet groove $a^7$ in which the said screws operate are placed removable washers $b^9$ and by means of this construction the position of the sleeve $b$ in the hub $a^3$ may be adjusted, it being understood that by removing the washers $b^9$ the sleeve $b$ may be forced farther into said hub when desired in order to take up the wear of the bearing and to keep the same tight and more effective in operation.

On each end portion of the spindle $a^2$ and within the hub $a^3$ are placed annular plates $c$ in which are placed bearing balls $c^2$ which are equally spaced and loosely mounted therein and which project from the sides thereof as clearly shown in Fig. 1 and between the annular plates $c$ I mount on the spindle $a^2$ a roller ball bearing cage comprising annular end members $d^2$, longitudinally arranged rollers $d^3$ and balls $d^4$ placed in the annular end members $d^2$ into which the ends of the rollers $d^3$ are fitted, said balls operating in grooves $d^5$ in the ends of said rollers.

A transverse section of one of the annular end members $d^2$ of the cage is shown in Fig. 9 and the inner or adjacent faces of these end members $d^2$ are provided with bores $d^6$ to receive the ends of the rollers $d^3$ and the bores $d^6$ from slots or openings $d^7$ in the inner and outer faces of said annular end members and said bores also form short web members $d^8$ between the slots or openings $d^7$, the opposite side portions of which are concave in cross section as clearly shown in Fig. 3, and placed centrally in said web members are the balls $d^4$ which are movable in transverse circular apertures $e^2$ in said web members and said balls $d^4$ when positioned in the manner described fit in and operate in the annular groove $d^5$ in the rollers $d^3$. The apertures $e^2$ in the web portions $d^8$ of the annular members $d^2$ are formed by a molding tool and in this operation slots or openings $e^3$ are formed in the inner ends of said web members and communicating with the apertures $e^2$ but the slots or openings $e^3$ have no function or operation in this apparatus. As shown in Figs. 1 and 8 one of the web portions $d^8$ of each of the annular members $d^2$ of the cage is provided with a circular hole or aperture $e^4$ which communicates with the ball aperture $e^2$ therein and the parts forming the ball bearing cage are assembled in the following manner: One of the rollers $d^3$ is placed in position between the annular end members $d^2$ of said cage and at one side of the web members $d^8$ in which the holes or apertures $e^2$ are formed and the balls $d^4$ in the next adjacent web members $d^8$ are placed in position and the successive next roller $d^3$ is then placed in position and this process is continued until all the rollers $d^3$ are placed in position entirely around the cage and when the last roller $d^3$ is placed in position the last balls $d^4$ are dropped in through the holes or apertures $e^4$ and said holes or apertures are closed by a screw or plug $e^5$ or in any other way.

After the parts of the ball bearing cage have been assembled in the manner described the said cage is slipped on over said spindle and within the sleeve $b$ as shown in Fig. 1, the inner annular plate $c$ having first placed in position, after which the outer annular plate $c$ is placed in position.

The spindle $a^2$ projects through the hub $a^3$ and in the outer end portion thereof are formed transverse recesses $f$, four of which are employed and these recesses form a rectangular neck $f^2$ which is preferably square in form and adapted to receive locking plates $g$ the outer surfaces of which are arc shaped in form and the inner surface of which are provided with V-shaped recesses to correspond with the form of the neck $f^2$ in cross section and the locking plates $g$ are provided adjacent to their outer surface with transverse apertures $g^2$, as shown in Figs. 2 and 5.

Mounted on the outer end portion of the spindle $a^2$ is a sleeve $h$ provided with a collar or flange $h^2$ which fits in the rabbet groove $a^7$ of the hub $a^3$ and in the face of which is formed a packing ring groove $h^3$ in which is placed a packing ring $h^4$. The sleeve $h$ is cut out centrally and transversely thereof to form a transverse aperture $h^5$ into which the locking plates $g$ are inserted and said sleeves are also screw threaded as shown at $h^6$ and screwed thereonto is an ordinary cap nut $h^7$. In practice the sleeve $h$ is first passed over the end of the spindle, the locking plates $g$ are inserted into position and the cap nut $h^7$ is then screwed home as shown in Figs. 1 and 5 and separate parts of the bearing are all securely locked in place and cannot be moved in any way without screwing off the cap nut $h^7$ and removing the locking plates $g$ after which the sleeve $h$, the adjacent annular plate $c$ and bearing cage may all be successively removed.

In order to be able to adjust the position of the sleeve $h$ on the end of the spindle I provide arc shaped washers $i$, one of which is shown in Fig. 10 and two of which are shown in use in Fig. 5 and these washers are placed on the opposite sides of the locking plates $g$ and in the transverse opening $h^5$ formed in the sleeve $h$ and by taking out the washer $i$ on the inner side of the locking plates $g$ and placing on the outer side thereof the sleeve $h$ may be drawn outwardly, and by taking out the washer $i$ on the outer side of the locking plates $g$ and placing it on the inner plates thereof, the sleeve $h$ may be pushed inwardly, and the position of this sleeve will regulate, of course, the position of the flange $h^2$ thereof and the extent of its bearing or pressure on the adjacent annular plate $c$ and the balls $c^2$ therein.

It will be understood that the annular members $d^2$ of the cage $d$ bear on the balls $c^2$ in the annular plates $c$ and by means of the construction herein described my improved bearing, or the parts thereof, may be adjusted at any time so as to take up any wear therein, the method of adjusting the sleeve $b$ having been hereinbefore described.

The radial slots $b^2$ in the sleeve $b$ render it elastic as will be readily understood and by forcing it inwardly as hereinbefore described, its transverse dimensions may be regulated as will be readily understood and in this way the bearing thereof on the rollers $d^3$ and the bearing of the roller on the spindle $a^2$ may be adjusted and this adjustment also effects, as will be apparent the balls $d^4$ and the operation thereof.

The washers $i$ are provided with apertures $i^2$ which correspond with the apertures $g^2$ in the locking plates $g$ and the sleeve $h$ is provided with recesses $j$ which communicate with the transverse aperture or opening $h^5$ therein, into which or through which the locking plates $g$ are passed and by inserting a suitable tool after the cap nut $h^7$ has been removed from under the spindle bore, the washers $i$ and the lock plates $g$ may be detached or removed as will be readily understood.

Whenever desired or necessary the screw $i^{12}$ may be removed from the hub $a^3$ and the annular groove $a^5$ in said hub may be filled with lubricating material as may also all the vacant space around the separate parts of the bearing in said hub and in this way the said bearing or all the parts thereof may be kept fully lubricated at all times and the amount of lubricating material may be inserted at one operation sufficient to render a repetition of said operation unnecessary for a considerable length of time.

It will be understood that the lubricant in the bearing as above mentioned will be retained therein longitudinally by the action of the packing rings $h^4$ and $a^{10}$ in the flange $h^2$ and the hub member $a^8$ respectively, and the screw $a^{12}$ will prevent its working out radially as will be understood.

The heads of the screws $b^8$ in the recesses $b^7$ of the elastic packing $b$ serve to prevent said packing from moving circumferentially as well as a means of its longitudinal adjustment as above set forth.

From the foregoing description it will be seen that the hub or head $a^3$, the hub member $a^8$ which fits in the annular groove $a^6$ in said hub or head and the flange or rim $h^2$ of the sleeve $h$ which fits in the annular groove $a^7$ in said hub or head form a housing through which the spindle passes and in which the separate parts of the bearing mounted on said spindle are placed, said parts including the elastic sleeve $b$, the roller cage and the annular plates $c$ having the balls $c^2$ which bear on the ends of said cage and on the hub member $a^8$ and the said flange or rim $h^2$ and although I have shown and described my improvement as applied to the spindle of an axle, it will be apparent that the same may be applied to spindles or journals of any kind or class, and the head of a crank rod or similar device may be substituted for the hub $a^3$ and the spindle $a^2$ may be substituted by the wrist pin or journal of a crank.

Having fully described my invention what I claim as new, and desire to secure by Letters Patent is:—

1. In a roller bearing, a cylindrical roller cage comprising annular end members and parallel rollers fitted in and rotatable in said annular end members, said annular end members being also provided with balls which are placed in suitable recesses formed therein and which operate in corresponding annular grooves formed in the end portion of said rollers.

2. In a roller bearing, a cylindrical roller cage, comprising annular end members and parallel rollers fitted in and rotatable in said annular end members, said annular end members being provided with longitudinally ranging web portions between which said rollers are placed, and said web portions being provided with balls which operate in corresponding annular grooves formed in the end portions of said rollers.

3. In a roller bearing, a cylindrical roller cage, comprising annular end members and parallel rollers fitted in and rotatable in said annular end members, said annular end members being provided with longitudinally ranging web portions between which said rollers are placed, and said web portions being provided with balls which operate in corresponding annular grooves formed in the end portions of said rollers, one of said web portions at each end being provided with a radial aperture which opens outwardly.

In testimony that I claim the foregoing as my invention I have signed my name in presence of the subscribing witnesses this 30th day of August 1909.

JOHN NEWMANN.

Witnesses:
H. R. CANFIELD,
C. E. MULREANY.